United States Patent
Sammoura

(10) Patent No.: US 12,073,649 B1
(45) Date of Patent: Aug. 27, 2024

(54) FINGERPRINT ENROLLMENT TEMPLATE STITCHING

(71) Applicant: Google LLC, Mountain View, CA (US)

(72) Inventor: Firas Sammoura, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/164,394

(22) Filed: Feb. 3, 2023

(51) Int. Cl.
*G06V 40/13* (2022.01)
*G06V 40/12* (2022.01)

(52) U.S. Cl.
CPC .......... *G06V 40/13* (2022.01); *G06V 40/1347* (2022.01)

(58) Field of Classification Search
None
See application file for complete search history.

(56) References Cited

U.S. PATENT DOCUMENTS

2016/0350574 A1* 12/2016 Weber ............... G06V 40/1335
2017/0076132 A1  3/2017 Sezan et al.
2017/0277935 A1  9/2017 Kao et al.

FOREIGN PATENT DOCUMENTS

CN 111429359 A 7/2020

* cited by examiner

*Primary Examiner* — Joseph R Haley
(74) *Attorney, Agent, or Firm* — Shumaker & Sieffert, P.A.

(57) ABSTRACT

A computing device obtains from a fingerprint sensor a first set of fingerprint data representative of a first portion of a finger positioned at the fingerprint sensor at a first time and a second set of fingerprint data representative of a second portion of a finger positioned at the fingerprint sensor at a second time. The computing device determines a first set of keypoints based on the first set of fingerprint data and second set of keypoints based on the second set of fingerprint data. The computing device determines for the first set of keypoints a first set of parameter values and for the second set of keypoints a second set of parameter values. The computing device generates an at least partial fingerprint based on the first set of fingerprint data, the second set of fingerprint data, the first set of parameter values, and the second set of parameter values.

20 Claims, 4 Drawing Sheets

FINGERPRINT ENROLLMENT TEMPLATE STITCHING

BACKGROUND

A computing device may include a touch or other presence sensor capable of detecting user input. For example, a computing device may include a presence-sensitive display capable of both displaying graphical objects and receiving user input to enable user interaction with the displayed graphical objects. Some example interactions include the user moving their finger across the presence-sensitive display to drag an object and/or cause the computing device to scroll. A computing device may also include a fingerprint sensor. In some examples, the computing device may require that a user place the user's finger at the fingerprint sensor as part of a fingerprint authentication operation.

SUMMARY

A computing device may use fingerprint data captured by a fingerprint sensor to generate an at least partial fingerprint of a finger of a user. The computing device may determine a first set of keypoints (e.g., minutiae points, distinct features, etc.) based on a first fingerprint image and a second set of keypoints based on a second fingerprint image. The computing device may determine a coordinate, a feature vector, and a quality for each keypoint from the first set of keypoints and second set of keypoints. Based on the coordinates and feature vectors of the keypoints, the computing device may align (e.g., combine, stitch, concatenate, etc.) the first fingerprint image and second fingerprint images when generating the at least partial fingerprint. Additionally, based on the quality of the keypoints, the computing device may store or discard data associated with the keypoints. For example, the computing device may store fingerprint images that are relatively high quality and discard fingerprint images that are relatively low quality such that fingerprint authentication may use higher quality fingerprint enrollment data. In this way, a fingerprint enrollment and authentication operations that use the at least partial fingerprint determined in accordance with techniques of this disclosure may be superior in terms of accuracy, quality, speed, etc.

In some examples, a method includes: obtaining, by one or more processors of a computing device and from a fingerprint sensor of the computing device, a first set of fingerprint data representative of a first portion of a finger positioned at the fingerprint sensor at a first time; determining, by the one or more processors and based on the first set of fingerprint data, a first set of keypoints; determining, by the one or more processors and for the first set of keypoints, a first set of parameter values for a set of parameters comprising a keypoint coordinate parameter, a feature vector parameter, and a keypoint quality parameter; obtaining, by the one or more processors and from the fingerprint sensor, a second set of fingerprint data representative of a second portion of the finger positioned at the fingerprint sensor at a second time; determining, by the one or more processors and based on the second set of fingerprint data, a second set of keypoints; determining, by the one or more processors and for the second set of keypoints, a second set of parameter values for the set of parameters; and generating, by the one or more processors, an at least partial fingerprint based on the first set of fingerprint data, the second set of fingerprint data, the first set of parameter values, and the second set of parameter values.

In some examples, a computing device includes: a fingerprint sensor; one or more processors; a memory that stores an operating system and instructions that, when executed by the one or more processors, cause the one or more processors to: obtain from the fingerprint sensor, a first set of fingerprint data representative of a first portion of a finger positioned at the fingerprint sensor at a first time; determine, based on the first set of fingerprint data, a first set of keypoints; determine, for the first set of keypoints, a first set of parameter values for a set of parameters comprising a keypoint coordinate parameter, a feature vector parameter, and a keypoint quality parameter; obtain, from the fingerprint sensor, a second set of fingerprint data representative of a second portion of the finger positioned at the fingerprint sensor at a second time; determine, based on the second set of fingerprint data, a second set of keypoints; determine, for the second set of keypoints, a second set of parameter values for the set of parameters; and generate an at least partial fingerprint based on the first set of fingerprint data, the second set of fingerprint data, the first set of parameter values, and the second set of parameter values.

In some examples, a non-transitory computer-readable storage medium stores instructions that, when executed, cause one or more processors of a computing device to: obtain from a fingerprint sensor of the computing device, a first set of fingerprint data representative of a first portion of a finger positioned at the fingerprint sensor at a first time; determine, based on the first set of fingerprint data, a first set of keypoints; determine, for the first set of keypoints, a first set of parameter values for a set of parameters comprising a keypoint coordinate parameter, a feature vector parameter, and a keypoint quality parameter; obtain, from the fingerprint sensor, a second set of fingerprint data representative of a second portion of the finger positioned at the fingerprint sensor at a second time; determine, based on the second set of fingerprint data, a second set of keypoints; determine, for the second set of keypoints, a second set of parameter values for the set of parameters; and generate an at least partial fingerprint based on the first set of fingerprint data, the second set of fingerprint data, the first set of parameter values, and the second set of parameter values.

In some examples, an apparatus includes: means for obtaining a first set of fingerprint data representative of a first portion of a finger positioned at the fingerprint sensor at a first time; means for determining, based on the first set of fingerprint data, a first set of keypoints; means for determining, for the first set of keypoints, a first set of parameter values for a set of parameters comprising a keypoint coordinate parameter, a feature vector parameter, and a keypoint quality parameter; means for obtaining a second set of fingerprint data representative of a second portion of the finger positioned at the fingerprint sensor at a second time; means for determining, based on the second set of fingerprint data, a second set of keypoints; means for determining, for the second set of keypoints, a second set of parameter values for the set of parameters; and means for generating an at least partial fingerprint based on the first set of fingerprint data, the second set of fingerprint data, the first set of parameter values, and the second set of parameter values.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
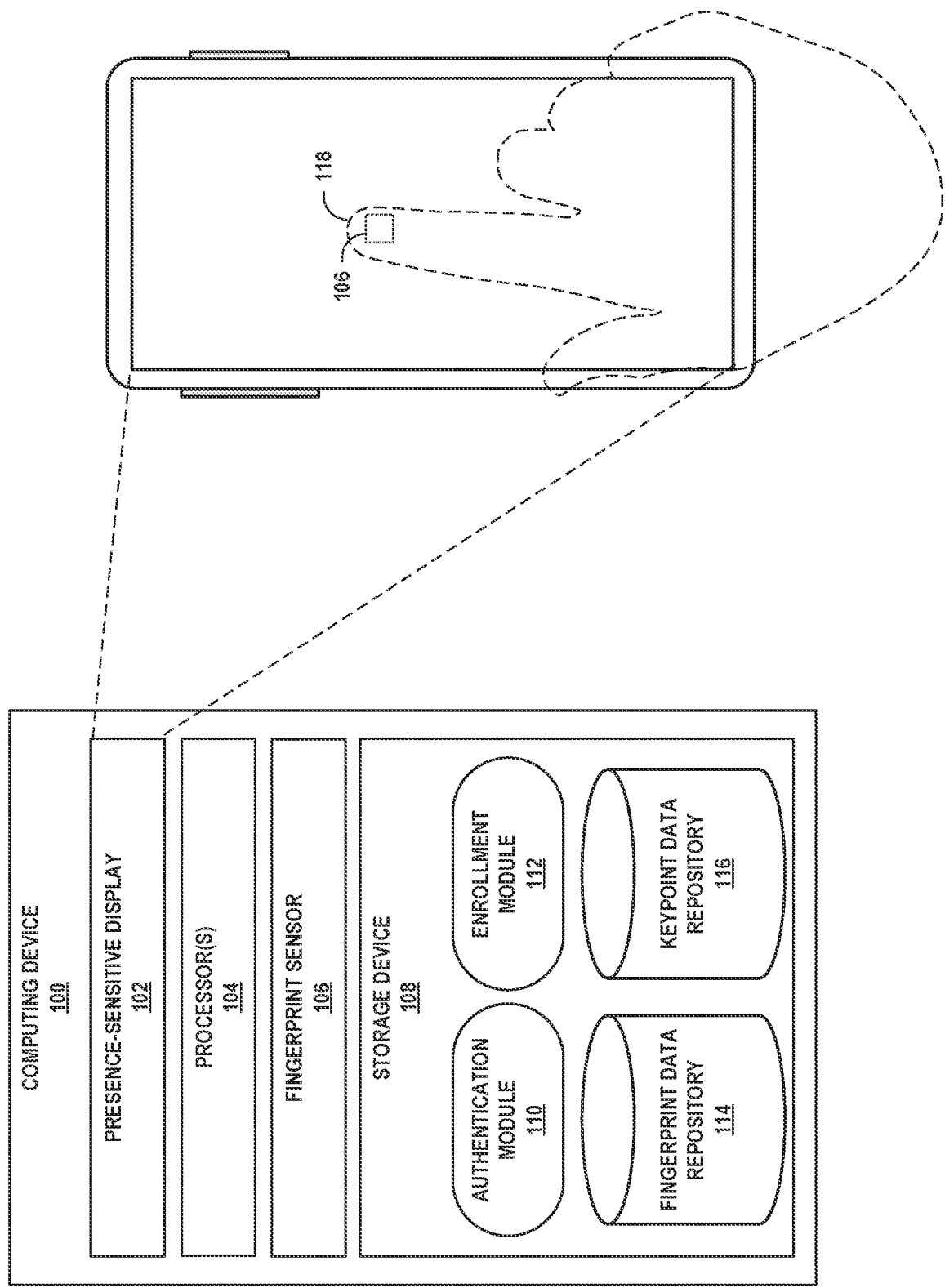
FIG. 1 is a conceptual diagram illustrating an example computing device in accordance with one or more aspects of the present disclosure.

FIG. 1 is a conceptual diagram illustrating an example computing device 100. FIG. 1 illustrates only one particular example of computing device 100, and many other examples of computing device 100 may be used in other instances. In the example of FIG. 1, computing device 100 may be a wearable computing device, a mobile computing device, or any other computing device capable of receiving user input. Computing device 100 may include a subset of the components included in example computing device 100 of FIG. 1 or may include additional components not shown in FIG. 1.

In the example of FIG. 1, computing device 100 may be a mobile phone, such as a smartphone. However, computing device 100 may also be any other type of computing device such as a camera device, a tablet computer, a laptop computer, a desktop computer, an e-book reader, or a wearable computing device (e.g., a computerized watch, computerized eyewear, etc.). As shown in FIG. 1, computing device 100 includes one or more presence-sensitive displays 102 ("presence-sensitive display 102"), one or more processors 104 ("processor 104"), one or more fingerprint sensors 106 ("fingerprint sensor 106"), and one or more storage devices 108 ("storage device 108"). As further shown in FIG. 1, storage device 108 may include an authentication module 110, an enrollment module 112, a fingerprint data repository 114, and a keypoint data repository 116.

Presence-sensitive display 102 may function as a respective input and/or output device for computing device 100. Presence-sensitive display 102 may be implemented using various technologies. For instance, presence-sensitive display 102 may function as an input device using a presence-sensitive input screen, such as a capacitive touchscreen or projective capacitance touchscreen. Presence-sensitive display 102 may also function as an output (e.g., display) device using any one or more display devices, such as liquid crystal displays (LCD), dot matrix displays, light emitting diode (LED) displays, microLED displays, miniLED displays, organic light-emitting diode (OLED) displays, e-ink, or similar monochrome or color displays capable of outputting visible information to a user of computing device 100. In the example of FIG. 1, presence-sensitive display 102 may be a presence-sensitive display capable of both receiving user input and displaying graphical data.

Processor 104 may implement functionality and/or execute instructions within computing device 100. Examples of processor 104 include, but are not limited to, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein.

Computing device 100 may include fingerprint sensor 106. Fingerprint sensor 106 may be located at a portion (e.g., a front portion, a back portion, and/or one or more side portions) of a housing of computing device 100. In various examples, fingerprint sensor 106 may be provided on the front portion of computing device 100 (e.g., positioned underneath one or more layers of presence-sensitive display 102) and on one or more side portions of computing device 100 (e.g., as part of a solid-state button). In other examples, fingerprint sensor 106 may be provided on the back portion of computing device 100. In the example of FIG. 1, fingerprint sensor 106 is provided on the front portion of computing device 100. In any case, fingerprint sensor 106 may detect one or more touch inputs 118 (e.g., a tap, press, etc.) and, based on touch inputs 118, capture fingerprint data (e.g., an image) representative of a portion of a hand (e.g., a finger) positioned at fingerprint sensor 106. The fingerprint data may be stored in fingerprint data repository 114.

Storage device 108 may include one or more computer-readable storage media. For example, storage device 108 may be configured for long-term, as well as short-term storage of information, such as instructions, data, or other information used by computing device 100. In some examples, storage device 108 may include non-volatile storage elements. Examples of such non-volatile storage elements include magnetic hard disks, optical discs, solid state discs, and/or the like. In other examples, in place of, or in addition to the non-volatile storage elements, storage device 108 may include one or more so-called "temporary" memory devices, meaning that a primary purpose of these devices may not be long-term data storage. For example, the devices may comprise volatile memory devices, meaning that the devices may not maintain stored contents when the devices are not receiving power. Examples of volatile memory devices include random-access memories (RAM), dynamic random-access memories (DRAM), static random-access memories (SRAM), etc.

In general, before computing device 100 may authenticate a user based on fingerprint information, computing device 100 captures the user's fingerprint information during an enrollment operation in which enrollment module 112 obtains and stores one or more reference fingerprints of the user. For example, enrollment module 112 may enroll a user's fingerprint by capturing, via fingerprint sensor 106, one or more images of the user's fingerprint when the user's finger is positioned (and, if required by the procedures of a fingerprint enrollment operation, repositioned) at fingerprint sensor 106. However, fingerprint sensor 106 may be relatively small (e.g., about 1 centimeter (cm) by 1 cm). As a result, fingerprint sensor 106 may only be able to capture an image of at most a portion of the user's fingerprint at any given time. Accordingly, enrollment module 112 may not accurately and/or completely determine the user's fingerprint based on the fingerprint data generated by fingerprint sensor 106, which may result in inaccurate and/or incomplete fingerprint enrollment. Inaccurate and/or incomplete fingerprint enrollment may adversely affect the performance of fingerprint authentication operations.

In accordance with techniques of this disclosure, computing device 100 may use keypoint data to generate an at least partial fingerprint of a finger of a user of computing device 100. By determining a partial fingerprint in accordance with techniques of this disclosure, computing device 100 may generate a more accurate representation of a fingerprint. For instance, the techniques may enable computing device 100 to more precisely align (e.g., combine, stitch, concatenate, etc.) images of portions of the user's fingerprint when determining the at least partial fingerprint. Thus, a fingerprint enrollment operation that generates an at least partial fingerprint determined in accordance with techniques of this disclosure may be superior in terms of accuracy, quality, speed, etc.

Enrollment module 112 of computing device 100 may execute a fingerprint enrollment operation that uses fingerprint data generated by fingerprint sensor 106 to generate an at least partial fingerprint. For example, a user may provide a first touch input to fingerprint sensor 106 by positioning a first portion of a finger at fingerprint sensor 106. At a first time, fingerprint sensor 106 may generate a first set of fingerprint data (e.g., an image) representative of the first portion of finger. As used herein, a set may refer to one or more elements. The first portion of the fingerprint may be any portion of the fingerprint, such as a center portion, top portion, bottom portion, edge portion, etc. Enrollment module 112 may obtain the first set of fingerprint data from fingerprint sensor 106.

As noted above, fingerprint sensor 106 may be relatively small compared to the size of a fingerprint such that fingerprint sensor 106 cannot capture an image or otherwise generate fingerprint data representative of the entirety of the fingerprint from just one touch input. As a result, for enrollment module 112 to enroll a sufficient area of the fingerprint, the user may need to reposition the finger at fingerprint sensor 106 such that a portion of the finger different from the first portion of the finger is positioned at fingerprint sensor 106, enabling fingerprint sensor 106 to obtain the remaining, uncaptured portions of the fingerprint.

Accordingly, the user may provide a second touch input to fingerprint sensor 106 by positioning a second portion of the finger at fingerprint sensor 106. In some examples, the user may provide the second touch input by lifting the finger off from fingerprint sensor 106 and touching fingerprint sensor 106 such that a different portion of the finger is positioned at fingerprint sensor 106. Alternatively, instead of lifting the finger off from fingerprint sensor 106, the user may slide the finger on fingerprint sensor 106 such that a second portion of the finger is positioned at fingerprint sensor 106.

The second portion of the finger is preferably a different portion of the finger than the first portion of the finger (e.g., to ensure that enrollment module 112 obtains fingerprint data for uncaptured portions of the fingerprint). However, the techniques of this disclosure may still apply when the second portion of the finger is substantially similar to the first portion of the finger. In any case, at a second time, fingerprint sensor 106 may generate a second set of fingerprint data representative of the second portion of finger. The second portion of the fingerprint may be any portion of the fingerprint, such as a center portion, top portion, bottom portion, edge portion, etc. Enrollment module 112 may obtain the second set of fingerprint data from fingerprint sensor 106.

Enrollment module 112 may determine a first set of keypoints based on the first set of fingerprint data and a second set of keypoints based on the second set of fingerprint data. As used herein, keypoints may refer to locations with distinctive features across a fingerprint that are invariant to fingerprint presentation (e.g., to fingerprint sensor 106) in terms of rotation, translation, pressure, etc. Enrollment module 112 may determine keypoints within a valid region of a set of fingerprint data, such as a region excluding the image borders with a width of N/2 pixels. In this way, enrollment module 112 may extract an image block of size N×N centered around each of the respective keypoints.

In a first example, enrollment module 112 may determine keypoints using the Grid technique. For example, enrollment module 112 may extract keypoints from predefined locations along a first set of fingerprint data and a second set of fingerprint data. In a second example, enrollment module 112 may determine keypoints using the Shi-Tomasi technique. For example, enrollment module 112 may use Shi-Tomasi corner detection to register locations with low-self similarity within a set of fingerprint data. Fingerprint minutiae such as ridge ends and bifurcations may be selected as corners because Fingerprint minutiae tend to be areas with high pixel contrast. In a third example, enrollment module 112 may determine keypoints using the Iterative Reduction Convolution-Based Keypoint Detection technique. The Iterative Reduction Convolution-Based Keypoint Detection technique may be a variation of the Shi-Tomasi technique. For example, enrollment module 112 may place keypoints only at the ridges or valleys of a fingerprint image where the response to a rotationally invariant kernel is extreme (e.g., maximum or minimum). As used herein, a kernel may refer to a shape detector configured to highlight ridge ends. It should be understood that other techniques for determining keypoints are contemplated by this disclosure.

Enrollment module 112 may determine a first set of parameter values for each keypoint from the first set of keypoints and a second set of parameter values for each keypoint from the second set of keypoints. The first set of parameter values and the second set of parameter values may be for a set of parameters including a keypoint coordinate parameter, a feature vector parameter, and a keypoint quality parameter.

A keypoint coordinate parameter value may indicate a position (e.g., [x, y] coordinates) of a keypoint. The position of the keypoint (e.g., determined in a manner described above) may be in a Cartesian coordinate system. Example keypoint coordinate parameter values may include [1, 2], [3, 22], [25, 72], [32, 65], etc.

A feature vector parameter value may indicate a description for a keypoint. Enrollment module 112 may calculate the feature vector parameter value using Polar Shapelet basis functions. For example, enrollment module 112 may convolve a set of fingerprint data with a set of discrete Polar Shapelet filters. As used herein, Polar Shapelet filters may refer to a set of orthogonal basis functions with explicit rotational symmetry. As such, enrollment module 112 may determine a feature vector that is rotationally invariant.

A keypoint quality parameter value may indicate a clarity of a keypoint (e.g., the clarity of a ridge or valley structure of a fingerprint). The local coherence of an intensity gradient may reflect the continuity of local ridge-valley direction in each image block (e.g., sized N×N) and thus correlate to image quality. In some examples, enrollment module 112 may determine the keypoint quality parameter value by averaging the coherence of several image blocks within a set of fingerprint data.

In some examples, there may be overlap between the first portion of the finger represented by the first set of fingerprint data and the second portion of the finger represented by the second set of fingerprint data. Such redundancy in the captured portions of a fingerprint may increase latency in fingerprint authentication operations (e.g., due to authentication module 110 searching through duplicative fingerprint data). To address this issue, enrollment module 112 may discard data associated with keypoints that are overlapping.

For example, enrollment module 112 may determine a distance between a first keypoint from the first set of keypoints and a second keypoint from the second set of keypoints. The distance may be based on a first keypoint coordinate parameter associated with the first keypoint and a second keypoint coordinate parameter associated with the second keypoint. Responsive to determining that the distance satisfies a distance threshold (e.g., the distance is equal to or less than a distance threshold d), enrollment module 112 may compare a first keypoint quality parameter value associated with the first keypoint with a second keypoint quality parameter value associated with the second keypoint and discard data associated with one of the two keypoints based on the comparison. For example, responsive to determining that the first keypoint quality parameter value is less than the second keypoint quality parameter value, enrollment module 112 may discard data associated with the first keypoint. Alternatively, responsive to determining that the second keypoint quality parameter value is less than the first keypoint quality parameter value, enrollment module 112 may discard data associated with the second keypoint. In this way, data associated with the higher quality keypoint may remain in keypoint data repository 116 (e.g., for use by authentication module 110).

In general, a person's fingerprint may subtly change over time. To ensure that the at least partial fingerprint generated by enrollment module 112 is not inaccurate due to being outdated, the set of parameters may further include an expiration date parameter, and enrollment module 112 may determine an expiration date parameter value for the first set of keypoints and the second set of keypoints. Enrollment module 112 may then determine whether a keypoint from the first set of keypoints or the second set of keypoints is expired based on an expiration date parameter value associated with the keypoint. Responsive to determining that the keypoint is expired, enrollment module 112 may discard data associated with the keypoint. Following discarding of the data, keypoint data repository 116 may no longer store the keypoint, and the first set of parameter values and/or the second set of parameter values may no longer include parameter values associated with the keypoint.

In any case, Enrollment module 112 may generate an at least partial fingerprint (e.g., a composite fingerprint) based on the first set of fingerprint data, the second set of fingerprint data, the first set of parameter values, and the second set of parameter values. Enrollment module 112 may align the first set of fingerprint data and the second set of fingerprint data based on the keypoint coordinate parameter values for the first set of keypoints and the keypoint coordinate parameter values for the second set of keypoints. The first keypoint coordinate parameter and the second keypoint coordinate parameter may be in a common Cartesian coordinate system.

Enrollment module 112 may process the first set of fingerprint data and the second set of fingerprint data to align the first set of fingerprint data and the second set of fingerprint data. For example, enrollment module 112 may apply a translation vector, a rotation matrix, etc., to the first set of fingerprint data and the second set of fingerprint data such that the positions of the first set of keypoints and the second set of keypoints in the at least partial fingerprint match the keypoint coordinate parameter values for the first set of keypoints and the keypoint coordinate parameter values for the second set of keypoints.

Thus, as discussed above, enrollment module 112 may align the first set of fingerprint data and the second set of fingerprint data using the first set of parameter values and the second set of parameter values to generate an at least partial fingerprint. Enrollment module 112 may align the first set of fingerprint data and the second set of fingerprint data to accurately correspond to the fingerprint of the user. It is noted that the techniques of this disclosure do not require that the first portion of a finger and the second portion of the finger be adjacent or contiguous portions of the fingerprint to align the first set of fingerprint data and the second set of fingerprint data. That is, the first portion and the second portion may be noncontiguous portions of the finger.

Enrollment module 112 may enroll the fingerprint of the finger of the user based on the at least partial fingerprint. For example, responsive to the partial fingerprint including a sufficient portion of the fingerprint, enrollment module 112 may complete a fingerprint enrollment operation. A sufficient portion of the fingerprint may be any percentage of the fingerprint, such as 75%, 85%, 95%, etc. In any case, enrollment module 112 may store the partial fingerprint for fingerprint authentication attempts.

In addition to a first touch input and a second touch input, touch inputs 118 may include one or more additional touch inputs (e.g., a third touch input, a fourth touch input, etc.). In such examples, the techniques of this disclosure may be similarly applied to the additional touch inputs in order to ensure that a sufficient portion of the fingerprint has been enrolled (e.g., because just the first portion and the second portion may be insufficient for completing a fingerprint enrollment operation). In addition, the techniques of this disclosure may be applied to one or more fingers, one or more hands, and one or more users.

Figure 2:
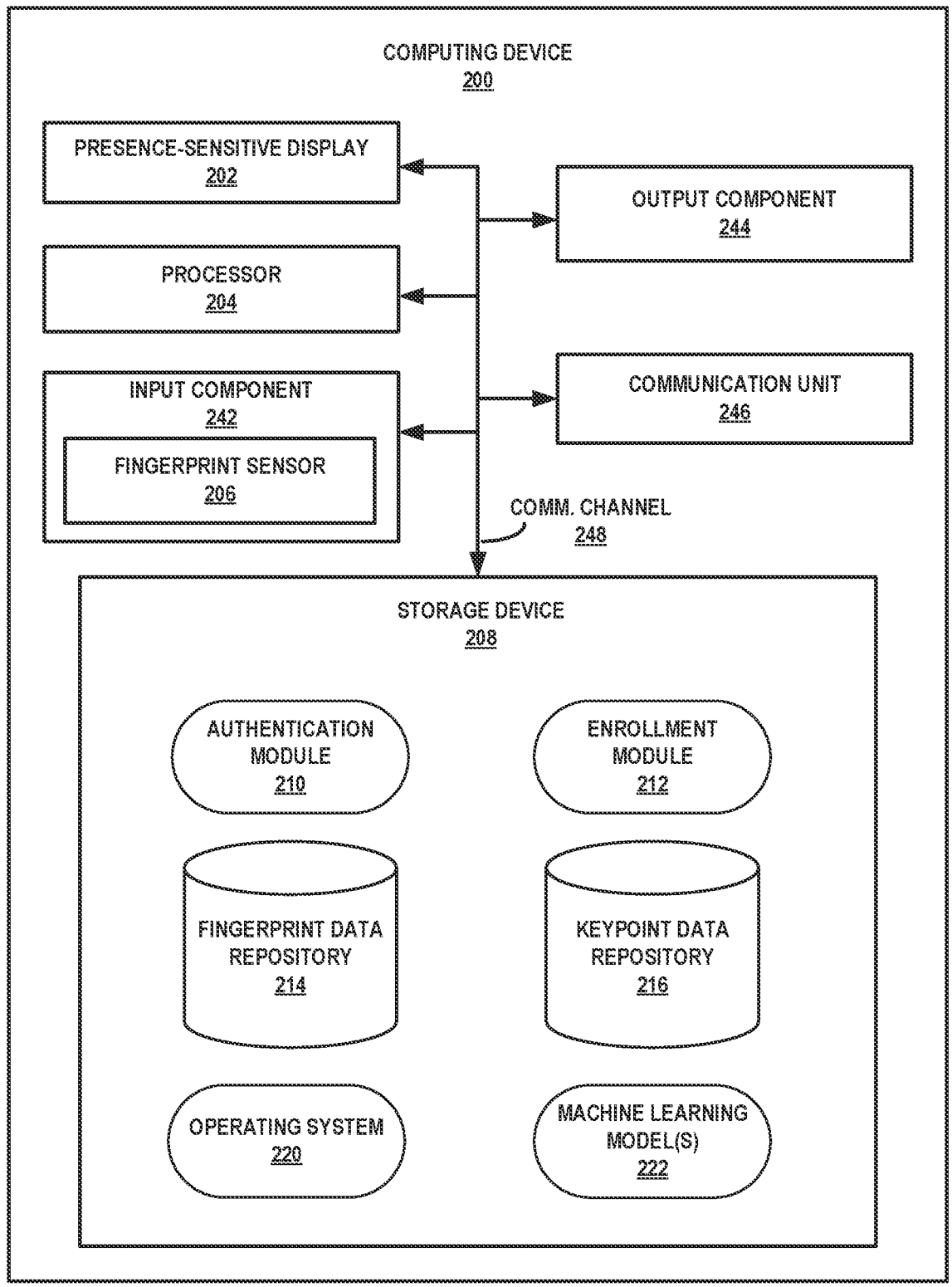
FIG. 2 is a block diagram illustrating further details of a computing device in accordance with one or more techniques of this disclosure.

FIG. 2 is a block diagram illustrating further details of a computing device 200 in accordance with one or more techniques of this disclosure. Computing device 200 of FIG. 2 may be an example of computing device 100 illustrated in FIG. 1. FIG. 2 illustrates only one particular example of computing device 200, and many other examples of computing device 200 may be used in other instances and may include a subset of the components included in example computing device 200 or may include additional components not shown in FIG. 2.

As shown in FIG. 2, computing device 200 may include one or more presence-sensitive displays 202 ("presence-sensitive display 202"), one or more processors 204 ("processor 204"), one or more input components 242 ("input component 242"), one or more communication units 244 ("communication unit 244"), one or more output components 246 (output component 246"), and one or more storage devices 208 ("storage device 208"). As also shown in FIG. 2, storage device 208 may include an authentication module 210, an enrollment module 212, a fingerprint data repository 214, a keypoint data repository 216, an operating system 220 ("OS 220"), and one or more machine learning models 222 ("machine learning models 222").

Presence-sensitive display 202 may detect input (e.g., touch and non-touch input) from a user of respective computing device 200. For example, presence-sensitive display 202 may detect indications of input by detecting one or more gestures from a user (e.g., the user touching, pointing, and/or swiping at or near one or more locations of presence-sensitive display 202 with a finger, stylus pen, or another user input element). Presence-sensitive display 202 may output information to a user in the form of a user interface (UI), which may be associated with functionality provided by computing device 200. Such UIs may be associated with computing platforms, operating systems, applications, and/or services executing at or accessible from computing device 200 (e.g., electronic message applications, chat applications, Internet browser applications, mobile or desktop operating systems, social media applications, electronic games, menus, and other types of applications).

Presence-sensitive display 202 may allow one or more sensors to operate through presence-sensitive display 202.

For instance, sensor signals and other external signals may pass through various layers of the presence-sensitive display 202 (making presence-sensitive display a "pass-through display"). To facilitate the pass-through nature of presence-sensitive display 202, various back coverings on presence-sensitive display 202 may be omitted during construction of presence-sensitive display 202 at locations above and/or adjacent to a location of fingerprint sensor 206 under presence-sensitive display 202. For example, presence-sensitive display 202 may include a back cover formed from foam (or other types of cushions) and copper (Cu) films that are removed in areas of the back cover above and/or adjacent to a location of fingerprint sensor 206. The omission of the back cover may allow the sensor signals and other external signals (e.g., light reflecting off a user's finger) to pass through presence-sensitive display 202.

In examples where fingerprint sensor 206 is a through-display fingerprint sensor, fingerprint sensor 206 may be underneath one or more layers of presence-sensitive display 202, such as a touchscreen layer of presence-sensitive display 202. In other words, fingerprint sensor 206 may be positioned within one or more of various layers of presence-sensitive display 202. Fingerprint sensor 206 may be configured to sense a fingerprint through presence-sensitive display 202.

Processor 204 may implement functionality and/or execute instructions within computing device 200. For example, processor 204 may receive and execute instructions that provide the functionality of authentication module 210, enrollment module 212, OS 220, and machine learning models 222. These instructions executed by processor 204 may cause computing device 200 to store and/or modify information within storage device 208 of processor 204 during program execution. Processor 204 may execute instructions of authentication module 210, enrollment module 212, OS 220, and machine learning models 222 to perform one or more operations. That is authentication module 210, enrollment module 212, OS 220, and machine learning models 222 may be operable by processor 204 to perform various functions described herein.

Storage device 208 within computing device 200 may store information for processing during operation of computing device 200 (e.g., computing device 200 may store data accessed by authentication module 210, enrollment module 212, OS 220, and machine learning models 222 during execution at computing device 200). In some examples, storage device 208 may be a temporary memory, meaning that a primary purpose of storage device 208 is not long-term storage. Storage device 208 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage device 208 may include one or more computer-readable storage media. Storage device 208 may be configured to store larger amounts of information than volatile memory. Storage device 208 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device 208 may store program instructions and/or information (e.g., fingerprint data repository 214, keypoint data repository 216, etc.) associated with authentication module 210, enrollment module 212, OS 220, and machine learning models 222.

Communication channels 248 ("COMM channel 248") may interconnect each of the components 202, 204, 208, 242, 244, and 246 for inter-component communications (physically, communicatively, and/or operatively). In some examples, communication channels 248 may include a system bus, a network connection, an inter-process communication data structure, or any other method for communicating data.

Input component 242 of computing device 200 may receive input. Examples of input are tactile, audio, and video input. Input component 242 of computing device 200, in one example, includes a presence-sensitive display, such as presence-sensitive display 202, a fingerprint sensor, such as fingerprint sensor 206, touch-sensitive screen, mouse, keyboard, voice responsive system, video camera, microphone or any other type of device for detecting input from a human or machine. As discussed above, fingerprint sensor 206 may be located at any portion of computing device 200, such as a front portion, a side portion, a rear portion, etc. In examples where fingerprint sensor 206 is located at the front portion, fingerprint sensor 206 may be a through-display fingerprint sensor. For example, fingerprint sensor 206 may be positioned underneath one or more layers of presence-sensitive display 202. Fingerprint sensor 206 may be configured to sense a fingerprint through presence-sensitive display 202. In examples where fingerprint sensor 206 is located at a side portion, fingerprint sensor 206 may be part of a solid-state button.

Input component 242 may include one or more sensors. Numerous examples of sensors exist and include any input component configured to obtain environmental information about the circumstances surrounding computing device 200 and/or physiological information that defines the activity state and/or physical well-being of a user of computing device 200. In some examples, a sensor may be an input component that obtains physical position, movement, and/or location information of computing device 200. For instance, sensors may include one or more location sensors (e.g., GNSS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

Communication unit 244 of computing device 200 may communicate with one or more external devices via one or more wired and/or wireless networks by transmitting and/or receiving network signals on the one or more networks. Examples of communication units 244 include a network interface card (e.g. such as an Ethernet card), an optical transceiver, a radio frequency transceiver, a GPS receiver, or any other type of device that can send and/or receive information. Other examples of communication unit 244 may include short wave radios, cellular data radios, wireless network radios, as well as universal serial bus (USB) controllers.

Output component 246 of computing device 200 may generate one or more outputs. Examples of outputs are tactile, audio, and video output. Output component 246 of computing device 200, in one example, includes a presence-sensitive display, sound card, video graphics adapter card, speaker, liquid crystal display (LCD), or any other type of device for generating output to a human or machine.

Computing device 200 may use the fingerprint data in fingerprint data repository 214 and keypoint data repository 216 for future fingerprint authentication attempts. For example, responsive to fingerprint sensor 206 detecting a current touch input by a user, authentication module 210 may initiate a fingerprint authentication operation. While detecting the current touch input, fingerprint sensor 206 may capture or otherwise generate current fingerprint data representative of the current touch input.

Authentication module 210 may determine whether the current fingerprint data captured by fingerprint sensor 206 corresponds to (e.g., matches) any enrolled fingerprint stored in fingerprint data repository 214 (e.g., the at least partial fingerprint generated by enrollment module 212). In some examples, authentication module 210 may determine correspondence of the current fingerprint data by comparing a captured image representative of the current touch input to any enrolled fingerprint stored in fingerprint data repository 214.

In some examples, authentication module 210 may use machine learning models 222 to determine correspondence of the current fingerprint data. For example, machine learning models 222 may perform classification in which machine learning models 222 provides a numerical value descriptive of a degree to which it is believed that the current fingerprint data should be classified into a "match" class or a "not match" class with respect to an enrolled fingerprint. In some instances, the numerical values provided by machine learning models 222 may be referred to as "confidence scores" that are indicative of a respective confidence associated with classification of the input into the respective class. In some examples, the confidence scores can be compared to one or more thresholds to render a discrete categorical prediction. In some examples, only a certain number of classes (e.g., one) with the relatively largest confidence scores may be selected to render a discrete categorical prediction.

In any case, authentication module 210 may selectively authenticate a user based on the correspondence of the current fingerprint data. For example, responsive to authentication module 210 determining that the current fingerprint data does not correspond to an enrolled fingerprint, authentication module 210 may deny authentication. In another example, responsive to authentication module 210 determining that the current fingerprint data corresponds to an enrolled fingerprint, authentication module 210 may authenticate the user of computing device 200 as the owner of computing device 200. In turn, OS 220 may perform an unlock operation or may otherwise provide the user with access to applications installed at computing device 200. In some examples, authentication module 210 may be considered a component of OS 220.

Figure 3:
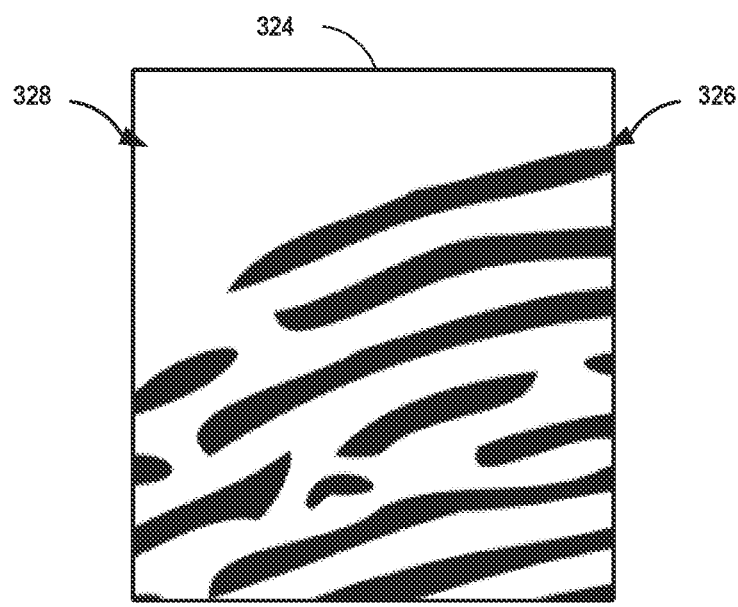
FIG. 3 is a conceptual diagram illustrating an image including a set of fingerprint data.

FIG. 3 is a conceptual diagram of an image 324 including a set of fingerprint data. Image 324 may be an image captured by fingerprint sensor 206. In some examples, a first portion 326 of image 324 may represent a portion of a fingerprint (e.g., a first set of fingerprint data) and a second portion 328 of image 324 may represent something other than a fingerprint (e.g., because fingerprint sensor 206 was not completely covered by the fingerprint). Enrolling second portion 328 may reduce the accuracy of an at least partial fingerprint generated by enrollment module 210.

Enrollment module 210 may use machine learning models 222 to perform image segmentation on image 324 to segment a fingerprint portion of image 324 from a non-fingerprint portion of image 324. For example, machine learning models 222 may perform one or more computer vision techniques (e.g., semantic segmentation, instance segmentation, etc.,) to label portions of image 324.

For example, machine learning models 222 may label pixels of image 324 with a corresponding class (e.g., fingerprint portion, non-fingerprint portion, etc.) of what machine learning models 222 predicts is being represented. Machine learning models 222 may label portions of image 324 based on image features (e.g., a piece of information about the content of image 324). Image features may include properties such as corners, edges, regions of interest points, ridges, patterns, etc. In some examples, machine learning models 222 may process image 324 to extract image features (e.g., through a form of content segmentation) and apply labels to each of the image features. A contiguous set of pixels having the same label may form a segment.

In some examples, a training module (e.g., executing at a computing system, such as a remote server) may train machine learning models 222 on a training dataset that includes training examples labeled as belonging (or not belonging) to one or more classes. In some examples, the training module may use supervised learning techniques to train machine learning models 222 to perform classification.

Figure 4:
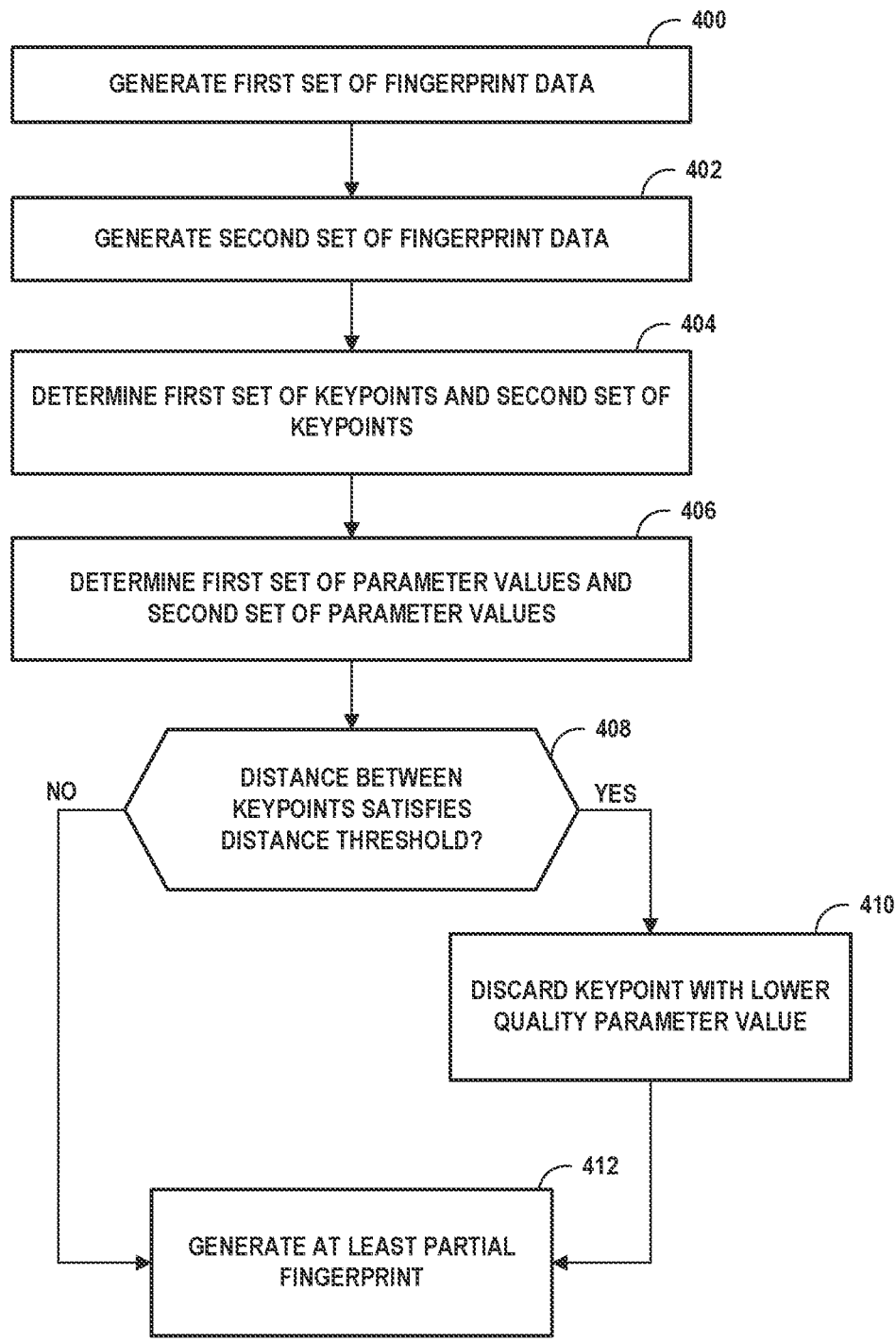
FIG. 4 is a flowchart illustrating example operations of an example computing device in accordance with one or more techniques of the present disclosure.

FIG. 4 is a flowchart illustrating example operations of an example computing device in accordance with one or more aspects of the present disclosure. Although the example operation of FIG. 4 is described as being performed by computing device 100 of FIG. 1, in other examples some or all of the example operation may be performed by another computing device.

A user may provide a first touch input to fingerprint sensor 106 by positioning a first portion of a finger at fingerprint sensor 106. At a first time, fingerprint sensor 106 may generate a first set of fingerprint data (e.g., an image) representative of the first portion of finger (400). The first portion of the fingerprint may be any portion of the fingerprint, such as a center portion, top portion, bottom portion, edge portion, etc. Enrollment module 112 may obtain the first set of fingerprint data from fingerprint sensor 106.

The user may provide a second touch input to fingerprint sensor 106 by positioning a second portion of the finger at fingerprint sensor 106. At a second time, fingerprint sensor 106 may generate a second set of fingerprint data representative of the second portion of finger (402). The second portion of the fingerprint may be any portion of the fingerprint, such as a center portion, top portion, bottom portion, edge portion, etc. Enrollment module 112 may obtain the second set of fingerprint data from fingerprint sensor 106.

Enrollment module 112 may determine a first set of keypoints based on the first set of fingerprint data and a second set of keypoints based on the second set of fingerprint data (404). Enrollment module 112 may determine keypoints within a valid region of a set of fingerprint data, such as a region excluding the image borders with a width of N/2 pixels. In a first example, enrollment module 112 may determine keypoints using the Grid technique. In a second example, enrollment module 112 may determine keypoints using the Shi-Tomasi technique. In a third example, enrollment module 112 may determine keypoints using the Iterative Reduction Convolution-Based Keypoint Detection technique.

Enrollment module 112 may determine a first set of parameter values for each keypoint from the first set of keypoints and a second set of parameter values for each keypoint from the second set of keypoints (406). The first set of parameter values and the second set of parameter values may be for a set of parameters including a keypoint coordinate parameter, a feature vector parameter, and a keypoint quality parameter.

Enrollment module 112 may determine whether a distance between a first keypoint from the first set of keypoints and a second keypoint from the second set of keypoints satisfies a distance threshold (408). The distance may be based on a first keypoint coordinate parameter associated with the first keypoint and a second keypoint coordinate parameter associated with the second keypoint. Responsive to determining that the distance satisfies a distance threshold ("YES" branch of 408), enrollment module 112 may compare a first keypoint quality parameter value associated with the first keypoint with a second keypoint quality parameter value associated with the second keypoint and discard data associated with one of the two keypoints based on the comparison (410). For example, responsive to determining that the first keypoint quality parameter value is less than or equal to the second keypoint quality parameter value, enrollment module 112 may discard data associated with the first keypoint. Alternatively, responsive to determining that the second keypoint quality parameter value is less than or equal to the first keypoint quality parameter value, enrollment module 112 may discard data associated with the second keypoint.

Responsive to determining that the distance between a first keypoint from the first set of keypoints and a second keypoint from the second set of keypoints does not satisfy a distance threshold ("NO" branch of 408), enrollment module 112 may then generate an at least partial fingerprint based on the first set of fingerprint data, the second set of fingerprint data, the first set of parameter values, and the second set of parameter values (412). Similarly, following discarding data associated with one of the two keypoints based on a comparison of keypoint quality parameter values (410), enrollment module 112 may generate an at least partial fingerprint based on the first set of fingerprint data, the second set of fingerprint data, the first set of parameter values, and the second set of parameter values (412).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   obtaining, by one or more processors of a computing device and from a fingerprint sensor of the computing device, a first set of fingerprint data representative of a first portion of a finger positioned at the fingerprint sensor at a first time;
   determining, by the one or more processors and based on the first set of fingerprint data, a first set of keypoints;
   determining, by the one or more processors and for the first set of keypoints, a first set of parameter values for a set of parameters comprising a keypoint coordinate parameter, a feature vector parameter, and a keypoint quality parameter;
   obtaining, by the one or more processors and from the fingerprint sensor, a second set of fingerprint data representative of a second portion of the finger positioned at the fingerprint sensor at a second time;

determining, by the one or more processors and based on the second set of fingerprint data, a second set of keypoints;

determining, by the one or more processors and for the second set of keypoints, a second set of parameter values for the set of parameters; and generating, by the one or more processors, an at least partial fingerprint based on the first set of fingerprint data, the second set of fingerprint data, the first set of parameter values, and the second set of parameter values.

2. The method of claim 1, wherein generating the at least partial fingerprint comprises:

determining, by the one or more processors, a distance between a first keypoint from the first set of keypoints and a second keypoint from the second set of keypoints, wherein the distance is based on a first keypoint coordinate parameter value associated with the first keypoint and a second keypoint coordinate parameter value associated with the second keypoint;

responsive to determining that the distance satisfies a distance threshold, comparing, by the one or more processors, a first keypoint quality parameter value associated with the first keypoint with a second keypoint quality parameter value associated with the second keypoint; and discarding, by the one or more processors, data associated with one of the first keypoint or the second keypoint based on the comparison of the first keypoint quality parameter value and the second keypoint quality parameter value.

3. The method of claim 2, wherein the first keypoint coordinate parameter value and the second keypoint coordinate parameter value are in a common Cartesian coordinate system.

4. The method of claim 1, further comprising using Polar Shapelet basis functions to determine a feature vector parameter value for each keypoint from the first set of keypoints and the second set of keypoints.

5. The method of claim 1, wherein obtaining the first set of fingerprint data comprises performing, by the one or more processors, image segmentation to a first image comprising the first set of fingerprint data.

6. The method of claim 1, wherein the set of parameters further includes an expiration date parameter, and wherein generating the at least partial fingerprint comprises:

determining, by the one or more processors, whether a first keypoint from the first set of keypoints is expired based on a first expiration date parameter value associated with the first keypoint; and responsive to determining that the first keypoint is expired, discarding, by the one or more processors, data associated with the first keypoint.

7. The method of claim 1, further comprising authenticating, by the one or more processors, a user of the computing device based on the at least partial fingerprint.

8. The method of claim 1, wherein the fingerprint sensor is a through-display fingerprint sensor.

9. A computing device comprising:
a fingerprint sensor;
one or more processors;
a memory that stores an operating system and instructions that, when executed by the one or more processors, cause the one or more processors to:
obtain from the fingerprint sensor, a first set of fingerprint data representative of a first portion of a finger positioned at the fingerprint sensor at a first time;

determine, based on the first set of fingerprint data, a first set of keypoints;

determine, for the first set of keypoints, a first set of parameter values for a set of parameters comprising a keypoint coordinate parameter, a feature vector parameter, and a keypoint quality parameter;

obtain, from the fingerprint sensor, a second set of fingerprint data representative of a second portion of the finger positioned at the fingerprint sensor at a second time;

determine, based on the second set of fingerprint data, a second set of keypoints;

determine, for the second set of keypoints, a second set of parameter values for the set of parameters; and generate an at least partial fingerprint based on the first set of fingerprint data, the second set of fingerprint data, the first set of parameter values, and the second set of parameter values.

10. The computing device of claim 9, wherein the one or more processors generate the at least partial fingerprint by:

determining a distance between a first keypoint from the first set of keypoints and a second keypoint from the second set of keypoints, wherein the distance is based on a first keypoint coordinate parameter value associated with the first keypoint and a second keypoint coordinate parameter value associated with the second keypoint;

responsive to determining that the distance satisfies a distance threshold, comparing a first keypoint quality parameter value associated with the first keypoint with a second keypoint quality parameter value associated with the second keypoint; and discarding data associated with one of the first keypoint or the second keypoint based on the comparison of the first keypoint quality parameter value and the second keypoint quality parameter value.

11. The computing device of claim 10, wherein the first keypoint coordinate parameter value and the second keypoint coordinate parameter value are in a common Cartesian coordinate system.

12. The computing device of claim 9, wherein the operating system and instructions further cause the one or more processors to use Polar Shapelet basis functions to determine a feature vector parameter value for each keypoint from the first set of keypoints and the second set of keypoints.

13. The computing device of claim 9, wherein the one or more processors obtain the first set of fingerprint data by performing image segmentation to a first image comprising the first set of fingerprint data.

14. The computing device of claim 9, wherein the set of parameters further includes an expiration date parameter, and wherein the one or more processors generate the at least partial fingerprint by:

determining whether a first keypoint from the first set of keypoints is expired based on a first expiration date parameter value associated with the first keypoint; and responsive to determining that the first keypoint is expired, discarding data associated with the first keypoint.

15. The computing device of claim 9, wherein the operating system and instructions further cause the one or more processors to authenticate a user of the computing device based on the at least partial fingerprint.

16. The computing device of claim 9, wherein the fingerprint sensor is a through-display fingerprint sensor.

17. A non-transitory computer-readable storage medium encoded with instructions that, when executed by one or more processors of a computing device, cause the one or more processors to:
- obtain from a fingerprint sensor of the computing device, a first set of fingerprint data representative of a first portion of a finger positioned at the fingerprint sensor at a first time;
- determine, based on the first set of fingerprint data, a first set of keypoints;
- determine, for the first set of keypoints, a first set of parameter values for a set of parameters comprising a keypoint coordinate parameter, a feature vector parameter, and a keypoint quality parameter;
- obtain, from the fingerprint sensor, a second set of fingerprint data representative of a second portion of the finger positioned at the fingerprint sensor at a second time;
- determine, based on the second set of fingerprint data, a second set of keypoints;
- determine, for the second set of keypoints, a second set of parameter values for the set of parameters; and
- generate an at least partial fingerprint based on the first set of fingerprint data, the second set of fingerprint data, the first set of parameter values, and the second set of parameter values.

18. The non-transitory computer-readable storage medium of claim 17, wherein the instructions cause the one or more processors to generate the at least partial fingerprint by:
- determining a distance between a first keypoint from the first set of keypoints and a second keypoint from the second set of keypoints, wherein the distance is based on a first keypoint coordinate parameter value associated with the first keypoint and a second keypoint coordinate parameter value associated with the second keypoint;
- responsive to determining that the distance satisfies a distance threshold, comparing a first keypoint quality parameter value associated with the first keypoint with a second keypoint quality parameter value associated with the second keypoint; and
- discarding data associated with one of the first keypoint or the second keypoint based on the comparison of the first keypoint quality parameter value and the second keypoint quality parameter value.

19. The non-transitory computer-readable storage medium of claim 18, wherein the first keypoint coordinate parameter value and the second keypoint coordinate parameter value are in a common Cartesian coordinate system.

20. The non-transitory computer-readable storage medium of claim 17, wherein the instructions further cause the one or more processors to use Polar Shapelet basis functions to determine a feature vector parameter value for each keypoint from the first set of keypoints and the second set of keypoints.

* * * * *